United States Patent [19]

Leiter

[11] 4,152,054
[45] May 1, 1979

[54] LIGHT-METERING SYSTEM IN ATTACHMENT CAMERA FOR OBSERVATION INSTRUMENTS, ESPECIALLY MICROSCOPES

[75] Inventor: Herbert Leiter, Wetzlar, Fed. Rep. of Germany

[73] Assignee: Ernst Leitz Wetzlar GmbH, Wetzlar, Fed. Rep. of Germany

[21] Appl. No.: 868,744

[22] Filed: Jan. 12, 1978

[30] Foreign Application Priority Data

Jan. 12, 1977 [DE] Fed. Rep. of Germany ....... 7700711

[51] Int. Cl.$^2$ .................... G02B 21/00; G03B 7/08; G03B 17/48
[52] U.S. Cl. ................................. 354/23 R; 350/18; 354/79
[58] Field of Search ................. 350/18, 19; 354/79, 354/23

[56] References Cited

U.S. PATENT DOCUMENTS

| | | | |
|---|---|---|---|
| 1,573,401 | 2/1926 | Heine | 350/18 X |
| 2,659,268 | 11/1953 | Grand | 350/18 |
| 2,737,079 | 3/1956 | Brown et al. | 354/79 X |
| 3,106,129 | 10/1963 | Frenk et al. | 350/19 X |

*Primary Examiner*—Donald A. Griffin
*Attorney, Agent, or Firm*—Schwartz, Jeffery, Schwaab, Mack, Blumenthal & Kock

[57] ABSTRACT

Disclosed is a light-metering system for an attachment camera of the type particularly adapted for use with an optical observation instrument having an optical axis comprising a mounting means positioned between the observation instrument and the shutter of the camera and being movable in at least two degrees of freedom; optical means positioned on the optical axis of the observation instrument for selectively deriving either an observation beam or a metering beam from the beam path of the observation instrument; a measuring diaphragm mounted on the mounting means and arranged in the image plane of the metering beam; a photoelectric receiver associated with the measuring diaphragm; a set of markings carried by the mounting means opposite to the measuring diaphragm and positioned in the observation beam; means positioned in the observation beam in a plane conjugated with the image plane of the observation instrument for viewing the image superimposed upon the set of markings; and means for moving the mounting means in the at least two degrees of freedom in order to selectively adjust the location on the viewing means of the set of markings which indicates the image area which is to be evaluated from the image field of the observation instrument.

15 Claims, 5 Drawing Figures

LIGHT-METERING SYSTEM IN ATTACHMENT CAMERA FOR OBSERVATION INSTRUMENTS, ESPECIALLY MICROSCOPES

BACKGROUND OF THE INVENTION

The invention concerns a light-metering system in an attachment camera for observation instruments, especially microscopes, with an observation and metering beam path derived from the beam path of the observation instrument by means of an optical structural group, a diaphragm arranged in the image plane of the path of the metering beam and a photoelectric receiver.

In order to adapt the diaphragm to a section of the image of the image field of the observation instrument to be evaluated by optical-electrical means, it has already been proposed to design the diaphragm in a fully reflecting form and thus to bring an image of the object to be photometered into the path of the observation beam.

The disadvantage of such a device lies in the fact that it is possible to work with only a given diaphragm magnitude. The continuous adaption of the diaphragm to the object and the visualization of the magnitude of the diaphragm and its location in the image of the object is not possible.

It has also been proposed to arrange an iris diaphragm in front of the exposure meter of a microscope in order to equilibrate the light flux. The disadvantage here again is that the iris diaphragm cannot be seen in the path of the observation beam of the instrument.

It has further been proposed to provide graticules in the path of the observation beam, corresponding to the image section of the image registering on a photographic device.

However, such devices require settings of excessive accuracy. In addition, the subjective impression as compared with a genuine diaphragm reproduction, is poor.

Finally, devices are known in which a variable diaphragm is illuminated by a source of light from behind and in which both the beam reflected by the diaphragm and the beam coming from the object of the observation instrument are guided by a beam splitter into the observation portion of the device directly or by way of a full mirror.

The disadvantage of these devices consists of the fact that an additional source of light is used to illuminate the diaphragm, which light source also interferes with the light receiver used in the photoelectric evaluation (dark current behavior).

SUMMARY OF THE INVENTION

The object of the invention is therefore to provide a light-metering system of the type described in the introduction, lacking the disadvantages of the devices mentioned above, which system should also be characterized by simple construction and the capability of adjusting the measuring spot variably with respect to location.

This object is attained in keeping with the invention by providing in a light-metering system a mount movable with at least two degrees of freedom and carrying a diaphragm, the photoelectric receiver and a mark carrier with a mark, said mount serving to adjust variably with respect to location, the area of the image to be evaluated from the field of image (measuring spot), by having said mount include a carrier receiving the optical structural group and by providing adjusting means, acting on said carrier and capable of moving the position of the optical structural group relative to the optical axis of the observation instrument and allowing selective derivation of the observation or the measuring beam path.

In a further development of the invention it is proposed that the mount consists of two parts, relatively movable with respect to each other and that the two parts of the mount are connected in an articulated manner. It is of advantage to connect the two parts with each other by means of a vertically arranged articulated pin.

It is further proposed in keeping with the invention that the part, freely movable in the horizontal direction, be equipped with a guide pin cooperating with a preferably stationary adjustable guideway. To insure the secure cooperation of the parts, the part freely movable in the horizontal direction should be exposed to the action of at least one spring.

It is intended that adjusting means, e.g., adjusting screws, should be used for the horizontal or vertical adjusting of the mount, said adjusting means being operated by means of a handle and that the mount is kept in contact with said adjusting screws by means of springs.

It is further proposed in keeping with the invention that the diaphragm associated with the path of the measuring beam and the marking carrier, carrying a marking and associated with the path of the observation beam, be arranged preferably at opposite ends of the mount and that—with consideration of optical structural parts placed in between—the diaphragm and the marking located on the mark carrier be correlated with respect to their sizes with each other.

It is further intended that the optical structural group contains a beam splitter cube. It is, however, also conceivable that the optical structural group should consist of two splitter prisms located adjacently to each other on the carrier, their splitter surfaces arranged with respect to each other so that upon the insertion of one of the splitter prisms in the beam path of the observation instrument, the observation or the measuring beam path is selectively derived.

If adjacent splitter prisms are used it is necessary to mount the carrier of the optical structural group displaceably with respect to the mount and to equip it with a suitable manual handle.

If a beamsplitter cube is used, it is suggested to mount the carrier of the optical structural group to be relatively rotatable and to equip it with drive means to execute such rotations.

DETAILED DESCRIPTION OF THE DRAWINGS

Figure 1:
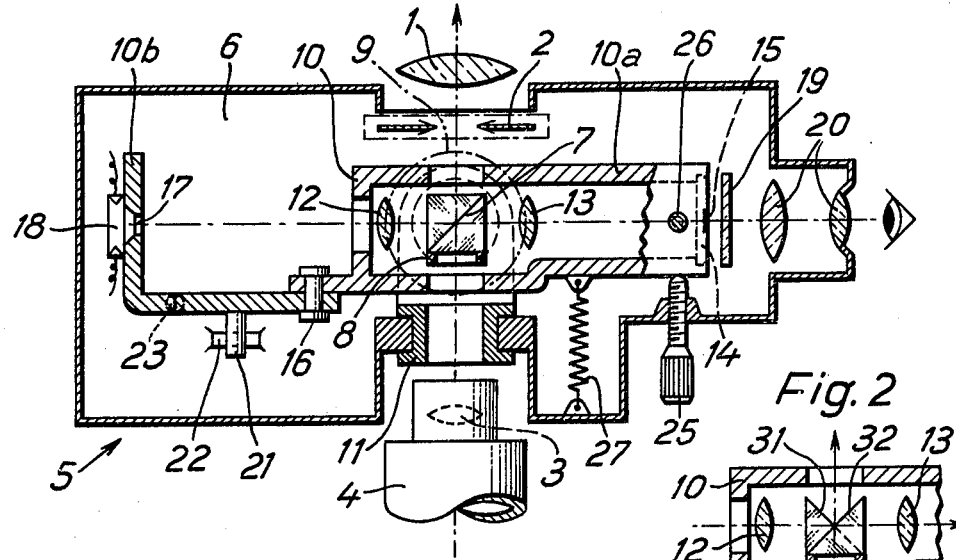

In the drawing the invention is schematically represented in examples of embodiment and subsequently described in more detail The figures show the following:

FIG. 1 a light-metering system according to the invention with a beam splitter cube in a side view.

Figure 2:
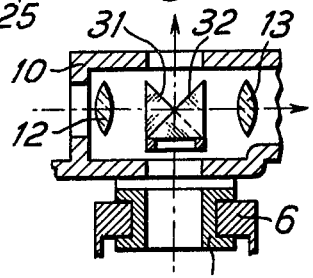

FIG. 2 a light-metering system according to FIG. 1, but with adjacent splitter prisms in detail.

Figure 3:
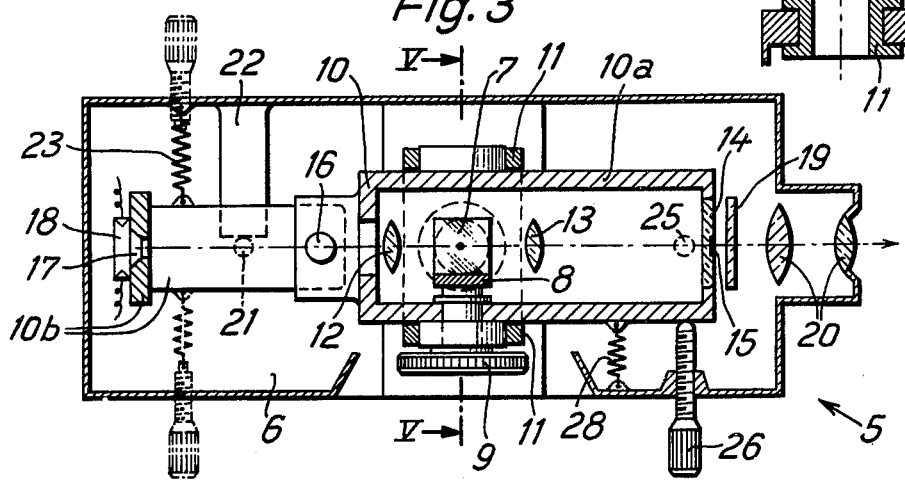

FIG. 3 the light-metering system according to FIG. 1 in a top view.

Figure 4:
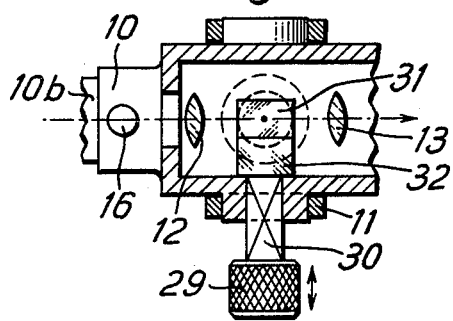

FIG. 4 the detail of FIG. 2 in a top view.

Figure 5:
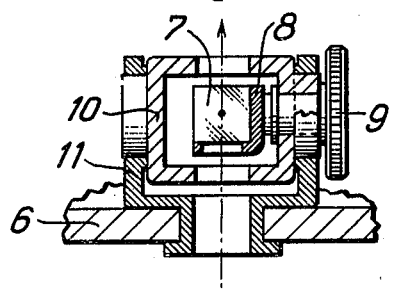

FIG. 5 a section along the Line V-V through FIG. 3 in a side view.

DETAILED DESCRIPTION OF PREFERRED EMBODIMENTS

In FIG. 1, 1 indicates the objective lens and 2 the shutter of an attachment camera not further shown, for an observation instrument represented by a lens 3 and a tube 4, e.g., a microscope.

Between the camera and the observation instrument a light-metering system 5 is located in a housing 6, on the optical axis. The system contains, as an optical structural group, a beam splitter cube 7, mirrored in a partially transparent manner, mounted rotatably on a carrier 8. The rotation may be activated by a manual handle 9.

The carrier 8 is supported in a mount 10 so that it can be rotated around an axis perpendicular to the optical axis of the observation instrument.

The mount 10 is supported rotatably around the same axis in an intermediate piece 11, which—rotatable itself around the same axis—is mounted in the housing 6.

The mount 10 consists of two pieces, with part 10a including in addition to the beam splitter cube 7, the optical members 12, 13, and at its right end a mark carrier 14 with a marking 15. At its left end, a part 10b is mounted by means of a hinged pin 16 with articulation and rotatably, which part is designed in an angular shape and contains on its upright leg a measuring diaphragm 17, associated with a photoelectric receiver 18.

The mark carrier 14 is located directly in front of a graticule or ground glass plate 19 which is in a plane conjugated with the image plane of the observation instrument; it can be observed by means of an ocular 20.

Part 10b of the mount 10 carries on its underside a guide pin 21, cooperating with a guide track 22, mounted stationarily on the housing. A spring 23, stressed between the housing 6 and the part 10b, is provided to obtain this cooperation.

Because the part 10a of the mount 10 can be rotated in two directions perpendicular to each other within the housing 6, means to position 10b are provided. In the present case, these means consist of setting screws 25, 26, located in the housing 6; said screws are arranged with their axes perpendicular to each other. Part 10b, is kept in contact with the setting screws 25, 26 by a frictional force provided by the tension springs 27, 28.

The mode of operation of the parts described in the foregoing is as follows:

The beam splitter cube 7 deflects the light arriving from the lens 3 initially for observation with the ocular 20 into the plane of the graticule or ground glass plate 19. By means of the setting screws 25 and 26, the mount 10, the parts 10a and 10b of which form in the plane of drawing of FIG. 1, a two-armed lever and horizontally to the plane of drawing of FIG. 3, an articulate lever, is rotated in the same or the opposite sense. This rotating motion sets the mark carrier 14 and its marking 15 onto an area of the image projected by the observation instrument onto the graticule or ground glass plate; said image segment corresponds in magnitude to the dimensions of the marking 15 and is to be evaluated. After this, the beam splitter cube 7 is rotated by 180°. This rotation can be coupled positively with the shutter release of the camera. The light now travels from the image segment selected through the measuring diaphragm 17 to the photoelectric receiver 18, which by reason of the incident light develops certain electric signals to be evaluated by a device, not shown here, for the control of the illumination of a photographic camera attachable to the observation instrument.

In place of the beam splitter cube, displayed in FIG. 1 and 3, naturally other optical components may also be used. An example is presented in FIG. 2 and 4. Here the carrier 8 is designed as a slide, which can be operated by way of a handle 29 through a connecting rod 30, so that two splitting prisms 31 and 32, mounted on said slide and producing diametrically directed paths of beams, are activated.

It is certainly also possible to mount the beam splitter cube 7 so that it can be rotated around the optical axis of the observation instrument. In this case, as in the examples displayed, the rotating motion can be obtained by means of a motor drive. As an example, for this purpose an electric motor would be suitable in the arrangement of FIG. 1 and 3 and for that of FIG. 2 and 4, a lifting magnet system.

Variations with respect to the guidance of part 10b are also possible. Thus, on the one hand, in place of the guide pin 21 with the guide track 22, a pin-slit guide may be used and, on the other hand, the part 10b can be stabilized by means of two diametrically acting springs, corresponding to the spring 23. In the latter case, at least one of these springs may act upon a screw located in the housing 6 and may thus have its tension altered for purposes of adjustment.

What is claimed is:

1. A light-metering system for an attachment camera of the type particularly adapted for use with an optical observation instrument having an optical axis comprising:
   a. mounting means positioned between the observation instrument and the shutter of the camera and being movable in at least two degrees of freedom;
   b. optical means positioned on the optical axis of the observation instrument for selectively deriving either an observation beam or a metering beam from the beam path of the observation instrument;
   c. a measuring diaphragm mounted on said mounting means and arranged in the image plane of the metering beam;
   d. a photoelectric receiver associated with said measuring diaphragm;
   e. a set of markings carried by said mounting means opposite to said measuring diaphragm and positioned in the observation beam;
   f. means positioned in the observation beam in a plane conjugated with the image plane of the observation instrument for viewing the image superimposed upon said set of markings; and
   g. means for moving said mounting means in said at least two degrees of freedom in order to selectively adjust the location on said viewing means of the set of markings which indicates the image area which is to be evaluated from the image field of the observation instrument.

2. The light-metering system according to claim 1, wherein said optical means for selectively deriving either an observation or a metering beam includes a movable carrier mounted on said mounting means, at least one optical element mounted on said carrier and means for adjusting the position of said carrier with respect to the optical axis of the observation instrument.

3. The light-metering system according to claim 2, wherein said mounting means comprises two parts relatively displaceable with respect to each other.

4. The light-metering system according to claim 3, wherein said two parts of the mounting means are connected articulately with each other.

5. The light-metering system according to claim 4 wherein said two parts of the mounting means are connected with each other by means of a hinge pin oriented parallel to the optical axis of the observation instrument.

6. The light-metering system according to claim 5, wherein the one of said parts carrying said measuring diaphragm is freely displaceable in the direction perpendicular to said hinge pin and includes a guide pin which cooperates with a stationary, adjustable guiding means fixed to the camera.

7. The light-metering system according to claim 6 further comprising at least one spring biasing said guide pin against said guiding means.

8. The light-metering system according to claim 2, wherein said optical element includes a beam splitter cube.

9. The light-metering system according to claim 8, wherein said carrier is rotatably mounted on said mounting means and wherein said adjusting means comprises means for rotating said carrier.

10. The light-metering system according to claim 2, wherein said optical element comprises two splitter prisms, the splitting surfaces of which are arranged with respect to one another so that alternate displacement of the two prisms laterally with respect to the optical axis of the observation instrument results in alternate production of the observation and the metering beams.

11. The light-metering system according to claim 10, wherein said carrier is mounted laterally displaceably on said mounting means and wherein said adjusting means comprises a handle for laterally displacing said carrier with respect to the optical axis of the observation instrument.

12. The light-metering system according to claim 1, wherein said moving means comprise manually operated adjusting means for moving said mounting means in two directions perpendicular to each other, one of said directions being parallel to the optical axis of the observation instrument.

13. The light-metering system according to claim 12, wherein said adjusting means comprise setting screws, and further comprising spring members for maintaining said mounting means in contact with the setting screws.

14. The light-metering system according to claim 1, said measuring diaphragm and its associated photoelectric receiver on the one hand, and the set of markings, on the other hand, are arranged on opposite ends of said mounting means.

15. The light-metering system according to claim 14, wherein said measuring diaphragm and the markings are correlated in their dimensions with each other based upon the optical structural elements inserted between them.

* * * * *